United States Patent
Mulry et al.

(10) Patent No.: US 8,706,575 B2
(45) Date of Patent: Apr. 22, 2014

(54) METHOD AND APPARATUS FOR TRANSACTION MANAGEMENT

(75) Inventors: Tatiana Mulry, Fairfield, CT (US); Anant Nambiar, Larchmont, NY (US); Simon Blythe, Cambridgeshire (GB)

(73) Assignee: Mastercard International Incorporated, Purchase, NY (US)

(*) Notice: Subject to any disclaimer, the term of this patent is extended or adjusted under 35 U.S.C. 154(b) by 0 days.

(21) Appl. No.: 11/640,747

(22) Filed: Dec. 18, 2006

(65) Prior Publication Data

US 2008/0147523 A1    Jun. 19, 2008

(51) Int. Cl.
*G07B 17/00* (2006.01)
*G07F 19/00* (2006.01)
*G07F 7/10* (2006.01)

(52) U.S. Cl.
USPC .............................. 705/30; 705/33

(58) Field of Classification Search
USPC ...................................... 705/30, 33
See application file for complete search history.

(56) References Cited

U.S. PATENT DOCUMENTS

| | | | |
|---|---|---|---|
| 5,748,908 A * | 5/1998 | Yu ................................... | 705/44 |
| 5,991,750 A * | 11/1999 | Watson ........................... | 705/44 |
| 7,006,986 B1 * | 2/2006 | Sines et al. ................. | 705/26.35 |
| 2001/0051917 A1 * | 12/2001 | Bissonette et al. .............. | 705/39 |
| 2002/0010612 A1 * | 1/2002 | Smith et al. ........................ | 705/8 |
| 2002/0156687 A1 * | 10/2002 | Carr et al. ....................... | 705/26 |
| 2003/0046195 A1 * | 3/2003 | Mao ................................ | 705/30 |
| 2003/0105711 A1 * | 6/2003 | O'Neil ............................ | 705/39 |
| 2003/0110136 A1 * | 6/2003 | Wells et al. .................... | 705/64 |
| 2004/0249745 A1 * | 12/2004 | Van Baaren .................... | 705/39 |
| 2005/0197913 A1 * | 9/2005 | Grendel et al. ................ | 705/26 |
| 2005/0197915 A1 * | 9/2005 | Biwer et al. ................... | 705/26 |
| 2005/0216375 A1 * | 9/2005 | Grendel et al. ................ | 705/28 |

* cited by examiner

*Primary Examiner* — Ig T An
(74) *Attorney, Agent, or Firm* — Buchanan Ingersoll Rooney PC

(57) ABSTRACT

A system, method, apparatus, means and computer program products for establishing, monitoring and maintaining spending controls in a payment system are provided.

13 Claims, 8 Drawing Sheets

| CUSTOMER IDENTIFIER 702 | ACCOUNT IDENTIFIER 704 | CONTACT INFORMATION 706 | SHORT TERM GOALS 708 | LONG TERM GOALS 710 | SPENDING TARGETS 712 | INCOME TARGETS 714 |
|---|---|---|---|---|---|---|
| 4388 2222 2222 2222 | 5555 5555 5555 5555 | John Doe, 111 Main, ... (603)123-2323; john@doe.com | Savings: $500; 12/25/06 | Home Down payment: $50,000, 1/1/2008 | Auto: $100, monthly Cash: $200, monthly Dining: $200, monthly | Personal: Salary, $5,000, monthly |
| 4388 9999 9999 9999 | 0123456778 21232; 4444 4444 4444 4444 | Jane Doe, 1 Oak ... (203)123-2323; jane@doe.com | Savings: $50, monthly Debt Reduction: $100, monthly | Retirement: $500,000, 1/1/2015 | Auto: $400, monthly Cash: $300, monthly Dining: $2000, annual | Investment: Annuity, $2000, Monthly |
| 5321 1234 5678 9999 | 02132453 234234; 3333 3333 3333 3333 | Sally Doe, 10 Elm ... (619)434-4343... sally@doe.com | Purchase: TV, $900, 1/15/07 Charity: Red Cross, $20, monthly | Job Change Savings: $25,000, 12/1/2007 | Phone: $120, monthly Entertainment: $400, monthly Charity: $400, annual | Other: Tax Refund, $1,000, one time |
| 5321 9999 8765 4321 | 5123 2222 2222 2222; 5213 3212 2321 3234; 03213344 23432 | Tom Jones, 9 Ash ... (703)323-3232... tom@jones.com | Savings: Baby, $2000, 6/15/07 Debt Reduction: Loan, $100, monthly | College Fund: $20,000, 6/15/2017 | Clothing: $400, monthly Gas: $120, monthly | Investment: Home sale, $430,000, one time |
| 4388 1234 5678 9999 | 02123234 3434534 | Tammy Tan, 19 Maple ... (705)565-7865... tan@yahoo.com | Savings: $1500, monthly | Purchase: Audi A6, $30,000, 10/1/07 | Utilities: $300, monthly Movies: $15, weekly Cash: $400, monthly | Personal: Bonus, $10,000, one time |

| ACCOUNT IDENTIFIER 802 | DATE 804 | AMOUNT 806 | PURCHASE DETAILS 808 |
|---|---|---|---|
| 4388 9999 9999 9999 | 06/29/2006 | $499.00 | Electronics, Store xxx |
| 4388 9999 9999 9999 | 07/02/2006 | $74.50 | Dining, Store yyy |
| 4388 2222 2222 2222 | 07/02/2006 | $12.12 | Gas, Store abc |
| 5678 1234 5678 9999 | 07/02/2006 | $489.00 | Travel, Store xyz |
| 4388 2222 2222 2222 | 07/03/2006 | $27.50 | Movie, Store zab |
| 4388 2222 2222 2222 | 07/03/2006 | $5.95 | Food, Store bcd |

# METHOD AND APPARATUS FOR TRANSACTION MANAGEMENT

BACKGROUND

Embodiments disclosed herein relate to payment systems. In particular, some embodiments relate to methods, apparatus, systems, means and computer program products for establishing, monitoring and maintaining spending controls in a payment system.

Most people (and businesses) have multiple payment accounts. For example, a typical individual has at least one bank account and one or more credit and debit cards. It can be difficult to manage the spending associated with each of these payment accounts. One solution is to download an electronic statement into a finance tool such as QuickBooks®. Unfortunately, this approach requires the user to remember to constantly download account information into the tool, and does not allow near real-time updates or insight into payment transactions.

BRIEF DESCRIPTION OF THE DRAWINGS

Features and advantages of some embodiments of the present invention, and the manner in which the same are accomplished, will become more readily apparent upon consideration of the following detail description of the invention taken in conjunction with the accompanying drawings, which illustrate preferred and exemplary embodiments and which are not necessarily drawn to scale, wherein:

FIG. 7 is a tabular representation of a portion of an account holder database pursuant to some embodiments of the present invention.

DETAILED DESCRIPTION

Figure 1:
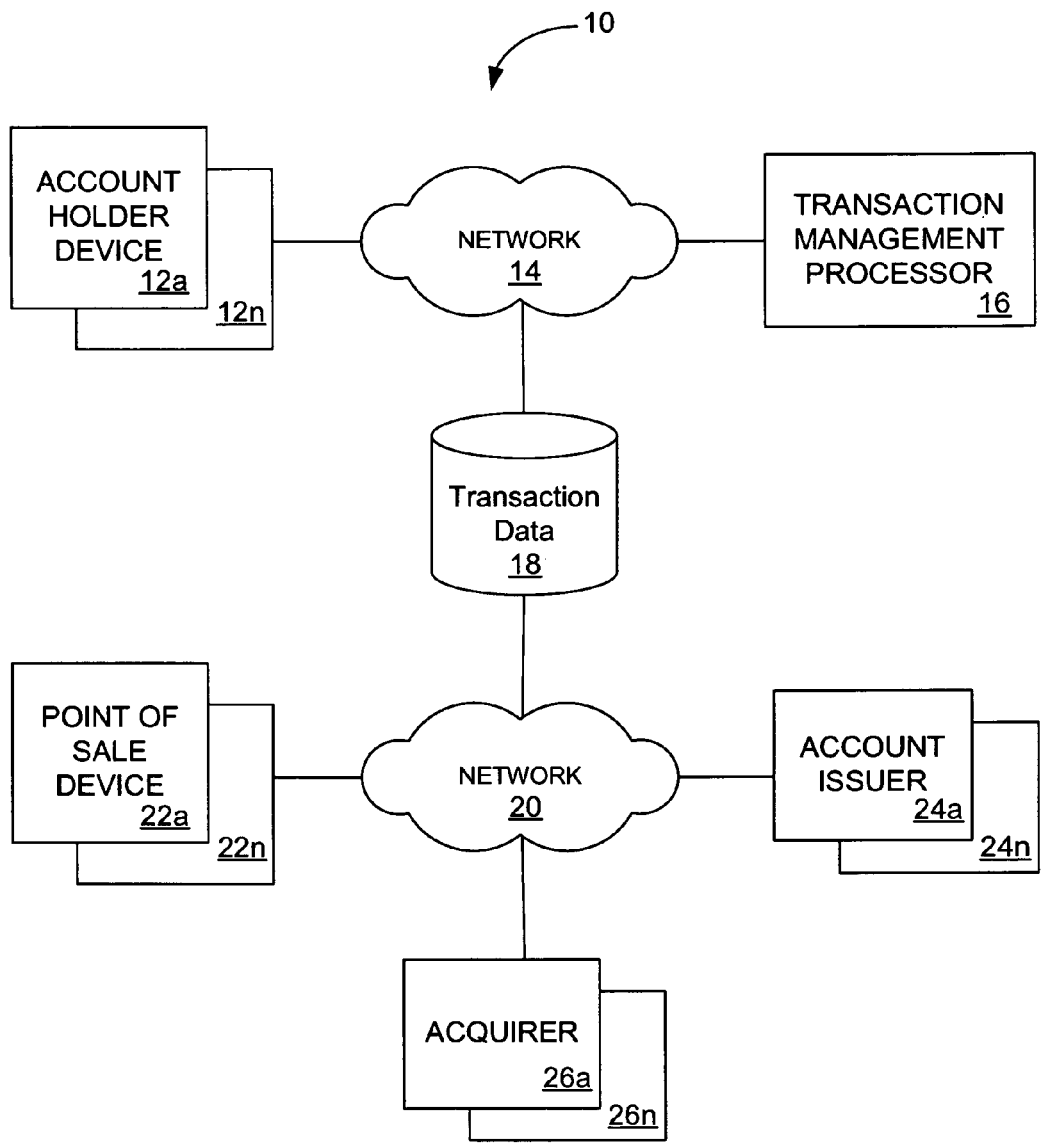
FIG. 1 is a block diagram illustrating a system according to some embodiments of the present invention.

Applicants have recognized that there is a need for methods, systems, apparatus, means and computer program products for establishing, monitoring and maintaining spending controls in payment systems.

In some embodiments, a spending management method includes establishing an account holder profile for an account holder where the account holder profile identifies one or more payment accounts held by the account holder and one or spending profiles where the spending profiles include one or more spending targets. On a scheduled basis, transaction data associated with individual transactions conducted by the account holder using the payment accounts are received. The transaction data includes detailed transaction information associated with payment transactions (e.g., such as the payment amount, payment date, merchant information, etc.). This transaction information is used to update the account holder's spending profile. The spending target(s) are then checked to determine whether the account holder is nearing or has exceeded the spending target(s).

The result is a system that allows an account holder to closely and accurately manage spending over one or more payment accounts by tracking actual transactions, and comparing the transactions to spending targets and spending profiles established by the account holder. By using actual transaction data (across one or more different payment accounts), the account holder has an accurate, up-to-date, and complete view of spending. Further, in some embodiments, the account holder can define alerts and messages that are triggered when certain spending conditions occur.

These and other features will be discussed in further detail below, by first describing a system, individual devices, exemplary databases and processes according to embodiments of the invention.

A number of terms will be used herein to describe features of some embodiments of the present invention. For example, the term "account holder" is used to refer to a customer or user of the system of the present invention to establish, monitor or maintain spending controls for one or more payment accounts. As a specific example, as used herein, an "account holder" may be an individual or entity that wishes to utilize features of the present invention to monitor their spending on one or more of their credit card accounts.

As used herein, the term "payment account" is used to refer to a financial account that is issued to an account holder and that may be used to make purchases. For example, a "payment account" may be a payment card account (such as a credit card account, a debit card account, a stored value card account, etc.), a checking or savings account, an investment account, or the like.

As used herein, the term "payment card" is generally used to refer to cards issued by financial institutions or other entities to account holders to access credit or debit accounts established on behalf of the consumer. As used herein, the term "payment card" generally includes different types of payment cards, such as co-brand cards, private label cards, and other card products that provide access to consumer accounts. For convenience, the term "payment card", as used herein, will generally be used to refer to both the physical card (which may be a magnetic stripe, contactless, smart card, or other type of card), as well as the account associated with the card.

To aid in understanding features of some embodiments, an illustrative example will now be introduced. The illustrative example will be referenced throughout this detailed description. The example is purely for illustration and is not intended to be limiting. In the example, an account holder named "John Doe" wishes to establish, monitor and maintain spending controls for two payment accounts held by him—a MasterCard® credit card account issued by a first financial institution ("Big Bank") and a MasterCard® debit card account issued by a second financial institution ("Small Bank").

John Doe wishes to establish, monitor and maintain spending controls for both of these payment accounts, and establishes a spending control account with a service provider offering a service or system implementing features of the present invention. In the example, the service provider provides access to the service or system via the Internet, and operates a Web server allowing customers such as John Doe access to a Web site allowing John Doe to create an account holder profile. John Doe logs in to the Web site and provides profile information, including his telephone number(s), address, email address(es), etc. John Doe then creates account profiles by providing information identifying his two payment accounts, including the name on the account, the account numbers, and the expiration dates of the two payment cards. By providing this information, John Doe allows the service provider to identify transaction data associated with those accounts, and then apply spending criteria and controls to those accounts.

John Doe then establishes one or more spending targets or other controls for his accounts. For example, John may create one or more spending categories (such as auto expenses, cash, dining expenses, travel expenses, etc) to be monitored. A spending target amount may be identified for each of these spending categories. An aggregate spending target across categories may also be established. John Doe may identify how the spending targets should be monitored—for example, through the calendar year, fiscal year, monthly, etc.

John Doe may also establish one or more alert criteria. For example, John may identify certain conditions that, if they occur, will generate an alert message which may be sent to him via the Internet, email, telephone, or the like. For example, John Doe may specify that he wants to receive an alert whenever a transaction greater than $500 occurs on any of his accounts, or when the accounts involve transactions totaling more than $500 in any day, or when an Internet or an International transaction has occurred, etc. In this way, John can carefully monitor transactions that may be indicative of fraud. John Doe may also establish alert criteria if any spending targets are being approached. For example, if John has established a spending target of $500/month for "dining" transactions across both his accounts, he may want to be alerted when he nears that target so that he can reduce his dining expenses for the remainder of the month.

Once John Doe has established a profile with one or more payment accounts, and a spending profile for those accounts, he may use the system to monitor and control his expenses. In this example, the service provider offering the service may have access to a data warehouse or database that receives transaction data for the accounts registered by John Doe. When the transaction data is received, the information is formatted and analyzed based on John Doe's profile, spending targets, alerts, and categories. John may then visit a Web page operated by the service provider and view his current spending information. The information may be presented in a number of ways, allowing John Doe to have an accurate and current view of his spending across both accounts. This illustrative example will be continued below to illustrate features of different aspects of the systems and methods of the present invention.

System

Referring now to FIG. 1, a transaction management system 10 for establishing, monitoring and maintaining spending controls pursuant to embodiments of the invention is shown. As depicted, a number of devices and entities interact to allow a customer or account holder to manage his or her spending data pursuant to embodiments of the present invention.

In the embodiment depicted in FIG. 1, a transaction management processor 16 is shown in communication over a network 14 with a number of devices or entities, including account holder devices 12a-n, and a transaction database 18. Transaction management processor 16 may be operated or controlled by an entity such as the service provider described in the illustrative example above. In some embodiments, transaction management processor 16 may be operated by or on behalf of a payment association such as MasterCard International, or some other entity having access to payment account transaction data. Transaction management processor 16 may be, or include, one or more Web servers configured to allow account holders (e.g., by operating account holder devices 12) access to services, tools, and data allowing the account holder to establish, monitor and maintain spending controls pursuant to the present invention. For example, an account holder may interact with transaction management processor 16 over a network such as the Internet.

Transaction database 18 receives transaction data about individual payment transactions over one or more network interfaces. In the embodiment depicted in FIG. 1, transaction data is received from a network 20 that is in communication with one or more point of sale ("POS") locations 22a-n, one or more acquirers 26a-n, and one or more account issuers 24a-n. In general, pursuant to some embodiments, transaction database 18 receives detailed transaction data associated with individual account holders who have registered to use the services of transaction management processor 16 to establish, monitor and maintain spending controls pursuant to the present invention. In some embodiments, transaction database 18 is a data warehouse receiving transaction data from a number of sources and allowing access to the data by transaction management processor 16 on a regular basis.

Pursuant to some embodiments, one or all of the devices or entities shown in FIG. 1 (including, for example, account holder device 12, POS device 22, transaction management processor 16, account issuer 24, and acquirer 26) may be or include any devices or systems capable of performing the various functions described herein. For example, account holder device 12 may be any number of known computing or communication devices allowing an account holder to interact with transaction management processor 16 to establish, monitor and maintain spending associated with one or more accounts. As specific examples, an account holder device 12 may be a personal computer, a handheld computer, a personal digital assistant, a telephone, or the like.

As a further example, POS device 22 may be a point of sale device in communication with a payment network to authorize and complete a transaction using a payment card or other payment device. For example, POS device 22 may be or include any of a number of known point of sale, point of purchase, or point of transaction devices that are used to process sales or purchases of goods. For example, one or more of POS devices 22a-n may be or include a VeriFone® Omni 3350 point of sale terminal or similar device which is configured to read payment card information at a point of sale. In some embodiments, one or more devices at POS device 22a-n may be coupled to a store server that is in communication with network 20 to transmit payment transaction information to an acquirer 26 and/or account issuer 24 for processing.

In some embodiments, one or more POS devices 22a-n may be Internet, mail order, or telephone locations in which transactions are conducted remotely and payment transaction information is submitted via network 20 to an acquirer 26 and/or account issuer 24 for processing. In other embodiments, one or more POS devices 22a-n may be or include a POS device that is in direct communication with other devices of system 10. Any number of POS devices 22a-n may be used in conjunction with embodiments of the present invention.

Account issuer 24 is a financial institution or other entity that issues payment accounts used in transactions pursuant to embodiments of the present invention. For example, one or more account issuers 24 may have one or more account relationships with a customer, including, for example, a payment card account (including, without limitation, a debit card account, a credit card account, a stored value card account or the like), a checking account, a consumer loan account, a secured loan account, a savings account, a retirement account, or other financial accounts. Pursuant to some embodiments, each account issuer 24 that wishes it's account holders to be able to utilize features of the present invention must register or establish a relationship with transaction management processor 16 (or the entity operating processor 16). This registration or establishment of a relationship may include allowing or providing access to transaction details associated with payment accounts issued by account issuer 24. As a specific, illustrative example where the entity operating transaction management processor 16 is a payment association (such as MasterCard International), account issuers 24 may opt in to allow their account holders to participate and authorize the use of transaction data in transaction database 18.

As used herein, networks 14 and 20 may employ any of a number of different types and modes of communication, and may be for example, a Local Area Network (LAN), a Metropolitan Area Network (MAN), a Wide Area Network (WAN), a proprietary network, a Public Switched Telephone Network (PSTN), a Wireless Application Protocol (WAP) network, a wireless network, a cable television network, or an Internet Protocol (IP) network such as the Internet, an intranet or an extranet. One or more of networks 14 and 20 may also be, for example, a financial transaction network, such as the MasterCard® BankNet network or other similar networks configured to route and transmit payment information.

A variety of individual networks and network protocols may be used in combination to transmit information between devices. For example, some of the POS devices 22a-n may be in communication with account issuers 24a-n and payment association 18 via a first network 20 (such as the BankNet network or a regional processing network), and one or more account holder devices 12a-n may be in communication with transaction management processor 16 via the Internet. Further, as used herein, communications include those enabled by wired or wireless technology.

Further details of one embodiment of transaction management processor 16 will now be described by referring to FIG. 2. In one embodiment, transaction management processor 16 is operated by an entity providing services to account holders pursuant to the present invention, allowing the account holders to establish, monitor and maintain spending controls for one or more of their payment accounts. Those skilled in the art will recognize, upon reading this disclosure, that transaction management processor 16 may be implemented as a network of computers, one or more system controllers, dedicated hardware circuits, programmed general purpose computers, or any other equivalent electronic, mechanical or electromechanical device or devices capable of providing the functionality described herein.

Figure 2:
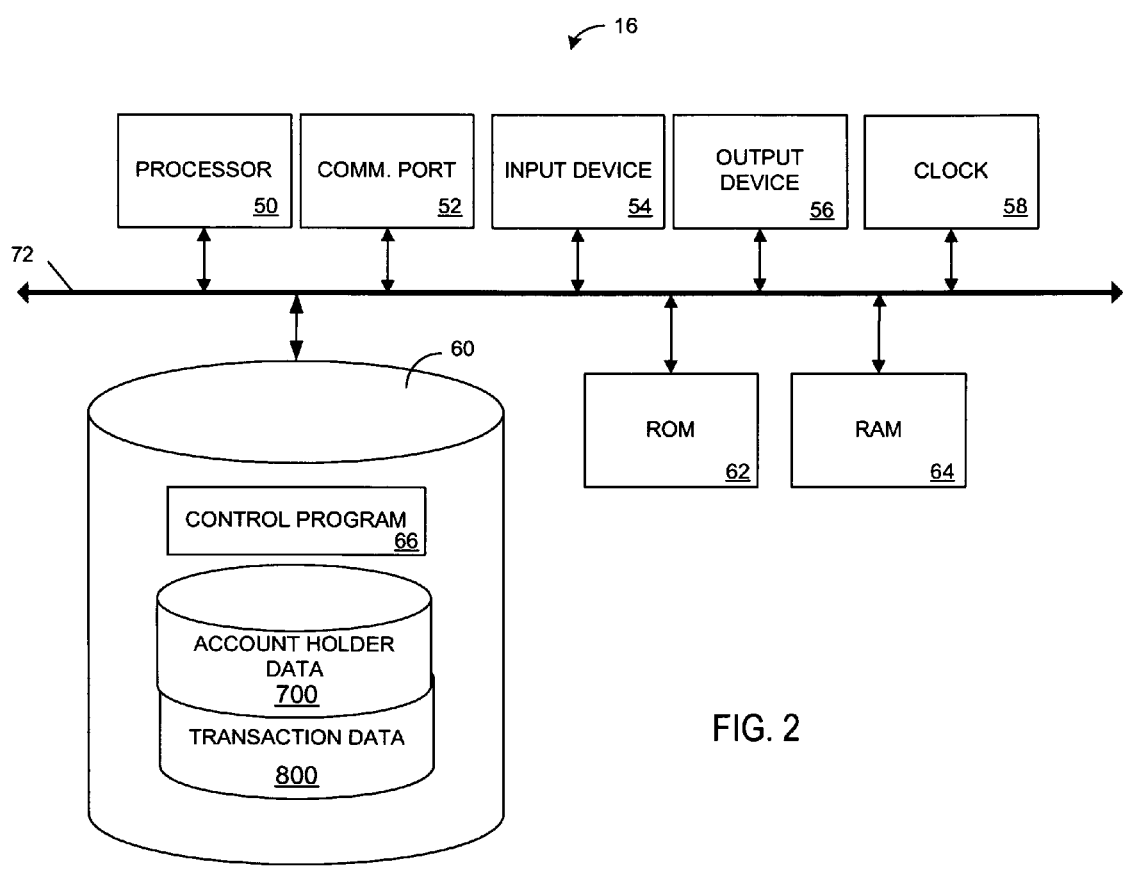
FIG. 2 is a block diagram illustrating a transaction management processor pursuant to some embodiments of the present invention.

FIG. 2 is a block diagram of the internal architecture of transaction management processor 16, according to one embodiment of the invention. As illustrated, transaction management processor 16 includes a microprocessor 50 in communication with communication bus 72. Microprocessor 50 may be a Pentium™ or other type of processor and is used to execute processor-executable process steps to control the components of transaction management processor 16 to provide functionality according to embodiments of the present invention.

A communication port 52 is also in communication with communication bus 72. Communication port 52 is used to transmit data to and to receive data from devices external to transaction management processor 16. Communication port 16 is therefore preferably configured with hardware suitable to physically interface with desired external devices and/or network connections. In one embodiment, files of electronic information are transmitted to and received from account holder devices 12a-n and transaction database 18 and other devices via communication port 52.

An input device 54, an output device 56 and a clock 58 are also in communication with communication bus 72. Any known input device may be used as input device 54, including a keyboard, mouse, touch pad, voice-recognition system, or any combination of these devices. Input device 54 may be used by an entity to input administrative, control and other data and information to transaction management processor 16. Such information may also be input to transaction management processor 16 via communication port 52. Commands for controlling operation of transaction management processor 52 may also be input using input device 54, such as commands to transmit a file, to receive a file, or the like.

Output device 56 may be any of a number of known output devices, such as, for example, a display device, a printer, or the like. A variety of memory devices may also be coupled to communication bus 72, including a random-access memory (RAM) 64 to provide microprocessor 50 with fast data storage and retrieval. In this regard, processor-executable process steps being executed by microprocessor 50 are typically stored temporarily in RAM 64 and executed therefrom by microprocessor 50. A read-only memory (ROM) 62, in contrast, provides storage from which data can be retrieved but to which data cannot be stored. Accordingly, ROM 62 may be used to store invariant process steps and other data, such as basic input/output instructions and data used during system boot-up or to control communication port 52. One or both of RAM 64 and ROM 62 may communicate directly with microprocessor 50 instead of over communication bus 72.

A data storage device 60 stores, among other data, a control program 66 of processor-executable process steps. Microprocessor 50 executes process steps of control program 66 to control transaction management processor 16 to operate pursuant to embodiments of the present invention. More specifically, the process steps of control program 66 may be executed by microprocessor 50 to achieve the functionality described in conjunction with FIGS. 3-6, below. Microprocessor 50 and data storage device 60 may each be, for example: (i) located entirely within a single computer or other computing device; or (ii) connected to each other by a remote communication medium, such as a serial port cable, telephone line or radio frequency transceiver. In one embodiment, transaction management processor 16 may comprise one or more computers that are connected to a remote server computer for maintaining databases.

The process steps of control program 66 may be read from a computer-readable medium (e.g., a floppy disk, a CD-ROM, a magnetic tape, a signal encoding the process steps, or the like) and then stored in data storage device 60 in a compressed, uncompiled and/or encrypted format. In alternative embodiments, hard-wired circuitry may be used in place of, or in combination with, processor-executable process steps for implementation of the processes of the present invention. Thus, embodiments of the present invention are not limited to any specific combination of hardware and software.

Data storage device 60, in one embodiment, also stores an account holder database 300 and a transaction database 400. These databases are described in detail below in conjunction with FIGS. 7-8. As will be understood by those skilled in the art, the schematic illustrations and accompanying descriptions of the databases presented herein are exemplary arrangements for stored representations of information. A number of other arrangements may be employed besides those suggested by the tables shown. Similarly, the illustrated entries of the databases represent exemplary information only; those skilled in the art will understand that the number and content of the entries can be different from those illustrated herein.

Registration Process Description

Figure 3:
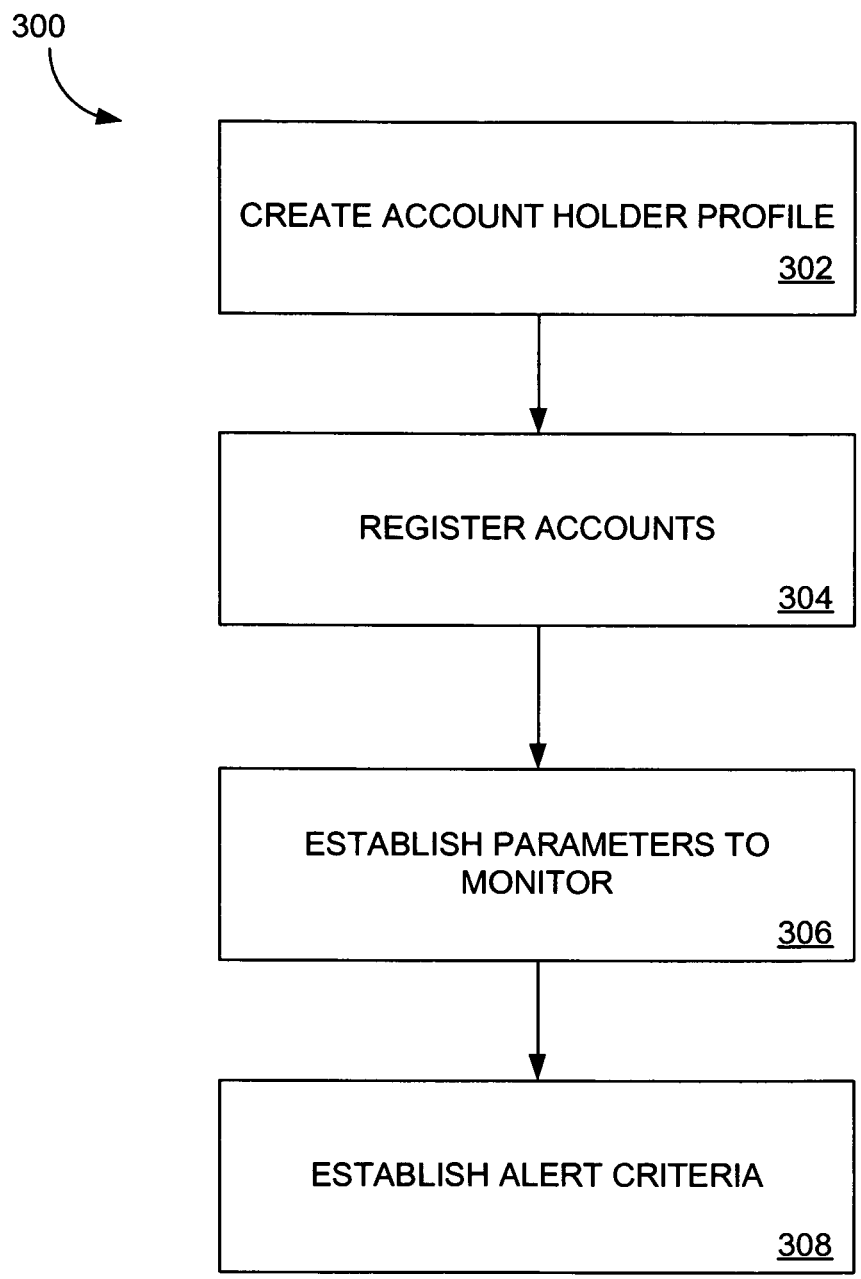
FIG. 3 is a flow diagram illustrating one embodiment of an account holder registration process pursuant to some embodiments of the present invention.

Reference is now made to FIG. 3, where a flow chart is shown which represents an exemplary process 300 for account holder registration pursuant to some embodiments of the present invention. The particular arrangement of elements in the flow chart of FIG. 3 is not meant to imply a fixed order to the steps; embodiments of the present invention can be practiced in any order that is practicable. In one embodiment, some or all of the steps of process 300 are performed under the direction or control of transaction management processor 16. In other embodiments, some or all of the steps may be performed by other devices or groups of devices of system 10.

Registration process 300 begins at 302 where an account holder interacts with transaction management processor 16 (e.g., over the Internet or by telephone) to create an account holder profile. For example, an account holder, operating a computer, may direct a Web browser to a website hosted by or on behalf of transaction management processor 16 and select an option to create an account holder profile allowing the account holder to establish, monitor and maintain spending controls using the present invention. The account holder may be asked to create a user name and password to create the account. The account holder may also be asked to provide personal and contact information allowing alerts and other information to be directed to the account holder.

Processing continues at 304 where the account holder interacts with transaction management processor 16 to register one or more payment accounts so that transactions involving those accounts may be monitored. For example, the account holder may be prompted to enter in a payment card number and expiration date, a bank account number (including an ABA number and account number), or other financial account information. In some embodiments, processing at 304 may include a step of confirming the validity and ownership of one or more of the registered accounts.

Processing continues at 306 where the account holder interacts with transaction management processor 16 to establish one or more parameters to monitor. For example, processing at 306 may include identifying one or more spending targets to be monitored as well as one or more categories in which the spending targets are to be monitored. For example, spending categories may include types of goods or services or merchants. As a specific example, an account holder may set up the following categories to monitor: auto expenses, cash expenses, dining expenses, travel expenses, etc.

A number of spending targets may also be established at 306, including individual targets for some or all of the categories and aggregate targets across categories. In some embodiments, parameters to monitor are established across each of the accounts registered at 304. In this manner, embodiments allow account holders to easily and accurately monitor, manage and maintain spending for a number of accounts.

Processing continues at 308 where account holder interacts with transaction management processor 16 to establish one or more alert criteria. For example, an account holder may specify one or more alerts that may occur if selected transaction conditions exist. For example, an account holder may request that an alert message be sent whenever a transaction exceeding a dollar limit occurs, or whenever a total transaction amount over a period of time (such as a day, or within an hour, etc.) occurs. As another example, an account holder may request an alert message whenever a particular type of transaction occurs (such as an Internet, mail order, International, cash advance or the like) or when transactions in a spending category approach a spending target (e.g., an alert may be requested whenever expenses in the auto expense category reach 10% of the spending target for that category). The account holder may also specify a delivery mechanism for each of the alerts specified at 308. For example, an account holder may request that alerts be delivered as one or more of: a phone message, an email message, an Instant Message, a short message service ("SMS") message, or the like.

In some embodiments, an account holder may update any of the parameters or information entered at 302-308. For example, the account holder may decide to add or delete a spending category, change a spending target, add a payment account, or the like. In some embodiments, one or more of steps 302-308 may be performed online, by telephone, or by mail.

Alert Process Description

Figure 4:
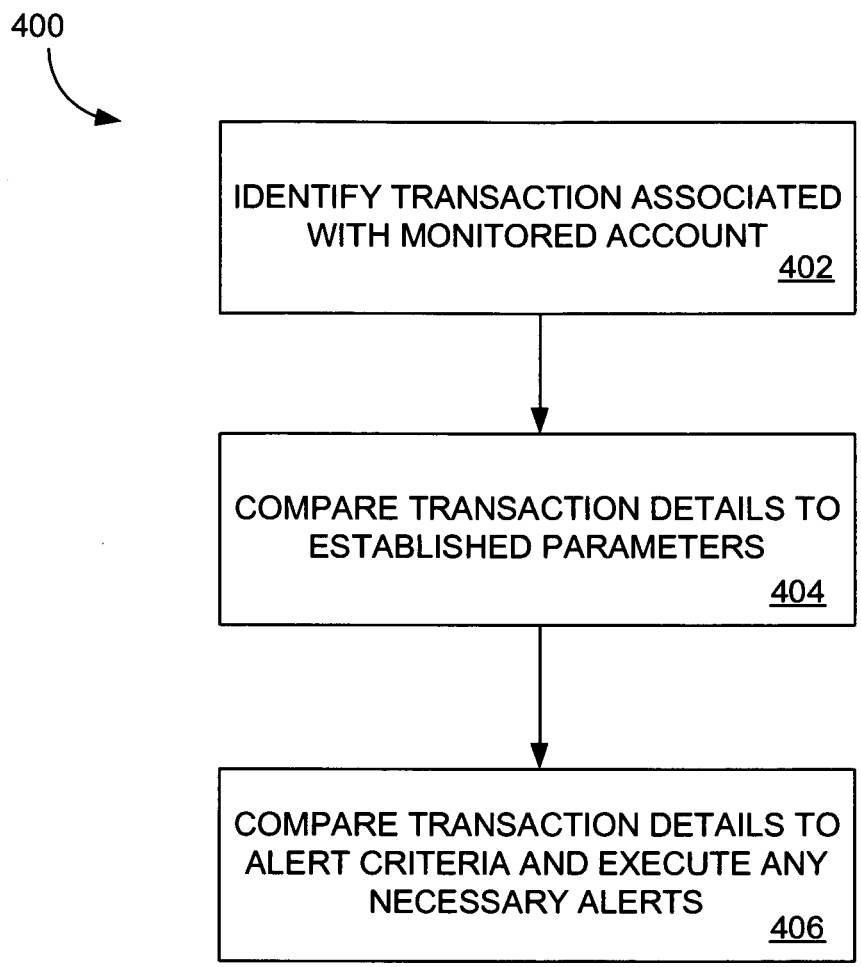
FIG. 4 is a flow diagram illustrating one embodiment of a monitoring process pursuant to some embodiments of the present invention.

Reference is now made to FIG. 4, where a flow chart is shown which represents an exemplary process 400 for alert monitoring pursuant to some embodiments of the present invention. The particular arrangement of elements in the flow chart of FIG. 4 is not meant to imply a fixed order to the steps; embodiments of the present invention can be practiced in any order that is practicable. In one embodiment, some or all of the steps of process 400 are performed under the direction or control of transaction management processor 16. In other embodiments, some or all of the steps may be performed by other devices or groups of devices of system 10.

Process 400 may be performed on a scheduled or regular basis, or it may be performed in near real time or when updates to transaction data associated with a registered account holder are received or identified. The process of loading transaction data pursuant to some embodiments is described below in conjunction with FIG. 6.

Process 400 begins at 402 where one or more transactions associated with a monitored account (or an account registered by a participating account holder) are identified. For example, on a scheduled or regular basis (or when new transaction data is identified), processing at 402 may operate to compare monitored accounts with transaction data to identify a subset of transaction data associated with the monitored account. Transaction data may be matched with monitored accounts, for example, by comparing the account number associated with each transaction with a table of monitored accounts.

Processing continues at 404 where the transaction details associated with the monitored account are compared to the spending parameters established by the account holder (e.g., using the process of FIG. 3, above). For example, processing at 404 may associate the transaction details about individual transactions with the categories established by the account holder (e.g., a transaction conducted at a gas station may be categorized in an "auto expense" category). In some embodiments, processing at 404 may include tagging or flagging each transaction so that it is sorted into the appropriate category so that it may be summed or reported to the account holder.

Processing continues at 406 where the transaction details are compared to the alert criteria established by the account holder (e.g., using the process of FIG. 3 above), and any necessary alerts are executed. For example, if an account holder, in his profile, requested an e-mail alert for any transactions exceeding $500, processing at 406 may create and send an email if a transaction exceeded $500.

Pursuant to some embodiments, the alerts sent at 406 may be sent in near real-time (shortly after the alert triggering condition is identified), or they may be sent in batches at a regular interval (e.g., every 15 minutes, every hour, at the end of the day, etc.).

Reporting Process Description

Figure 5:
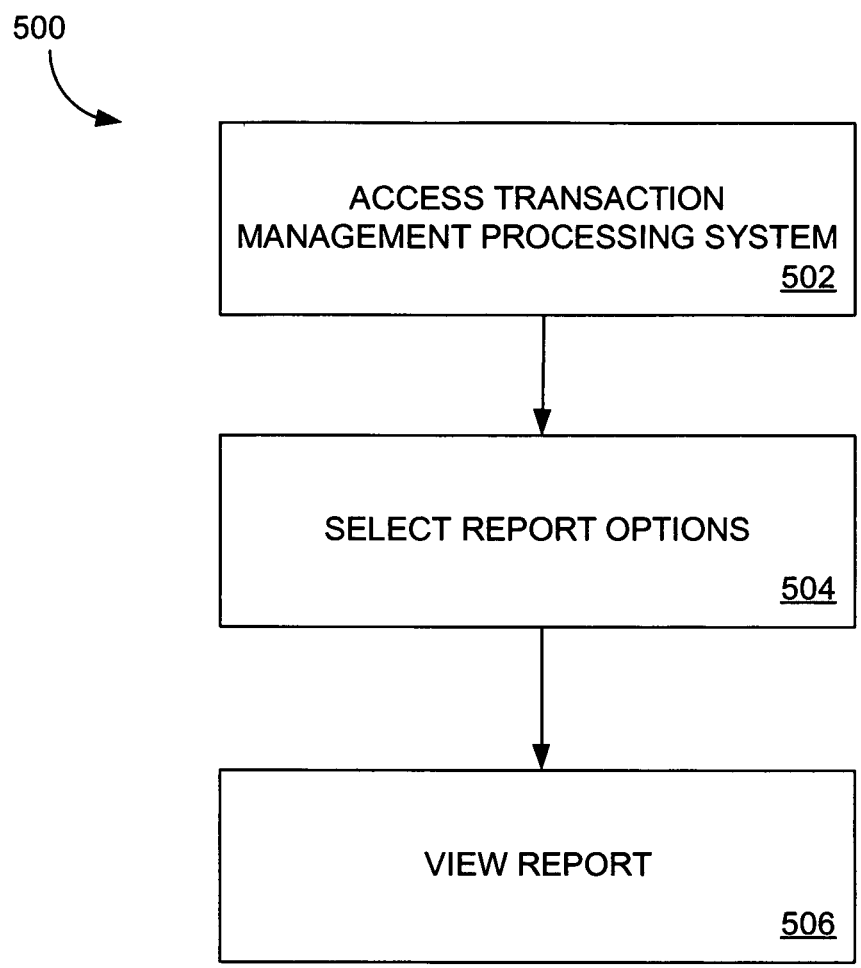
FIG. 5 is a flow diagram illustrating one embodiment of an account holder login and reporting process pursuant to some embodiments of the present invention.

Reference is now made to FIG. 5, where a flow chart is shown which represents an exemplary process 500 for reporting pursuant to some embodiments of the present invention. The particular arrangement of elements in the flow chart of FIG. 5 is not meant to imply a fixed order to the steps; embodiments of the present invention can be practiced in any order that is practicable. In one embodiment, some or all of the steps of process 500 are performed under the direction or control of transaction management processor 16. In other embodiments, some or all of the steps may be performed by other devices or groups of devices of system 10.

Reporting process 500 may be conducted at any time by a registered account holder (e.g., an account holder who registered using the process of FIG. 3 above). Process 500 begins at 502 after an account holder, who has logged into transaction management processor 16 (of FIG. 1) requests a report or a view of transaction information. At 504, the account holder selects one or more report options. For example, the account holder may request to view spending target information by year, by month, by week, by day, or the like. As another example, the account holder may request to view a spending summary by date over a selected period, or a spending summary by category. Further, the account holder may also select to view specific transaction details by category or by date. The report options are submitted to transaction management processor 16, and processing continues at 506 where the account holder views the report. In some embodiments, the account holder may view report details in one or more chart formats, and may also elect to receive the report as a downloaded spreadsheet or formatted document. In some embodiments, the account holder may specify default reporting formats and requirements, allowing easy access to preferred data.

Data Load Process Description

Figure 6:
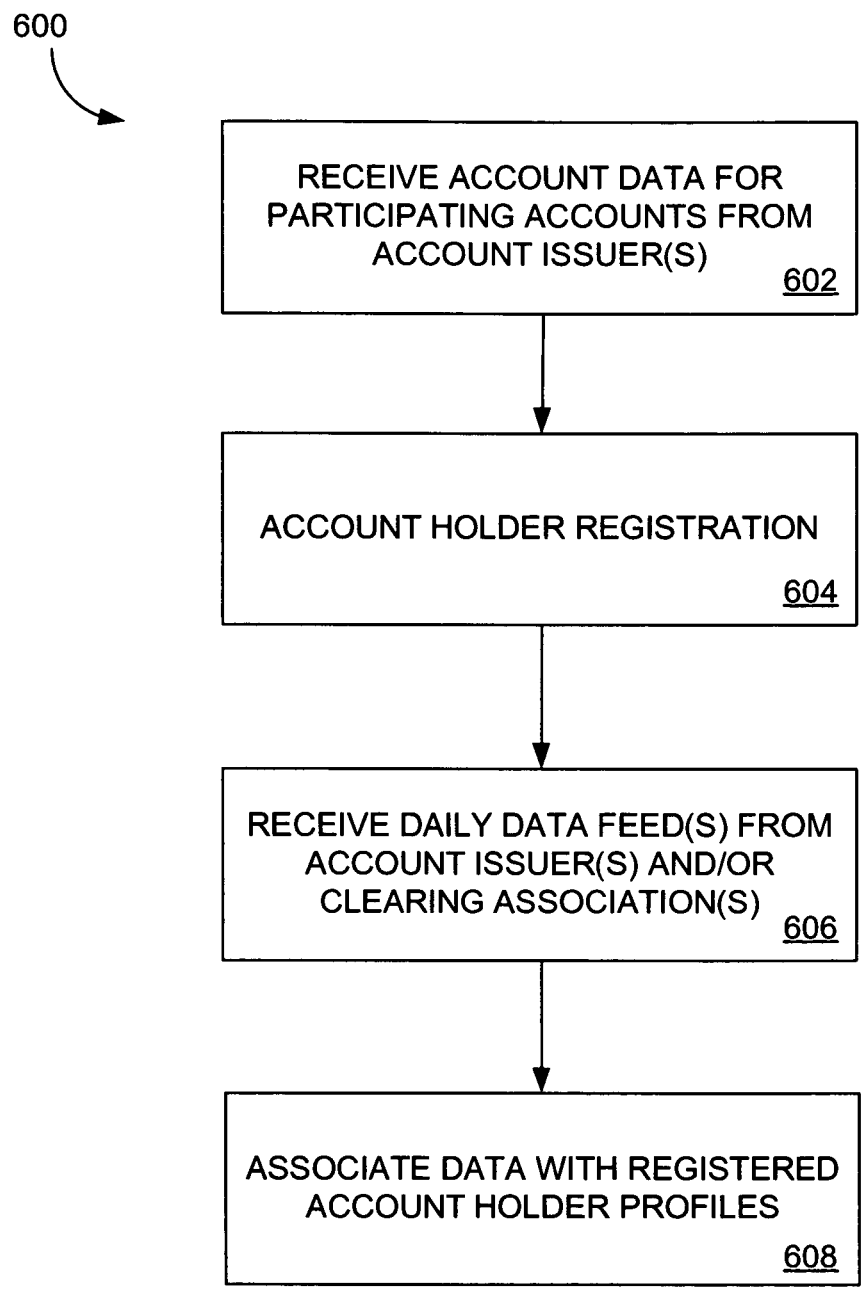
FIG. 6 is a flow diagram illustrating one embodiment of a data loading process pursuant to some embodiments of the present invention.

Reference is now made to FIG. 6, where a flow chart is shown which represents an exemplary process 600 for data loading pursuant to some embodiments of the present invention. The particular arrangement of elements in the flow chart of FIG. 6 is not meant to imply a fixed order to the steps; embodiments of the present invention can be practiced in any order that is practicable. In one embodiment, some or all of the steps of process 600 are performed under the direction or control of transaction management processor 16. In other embodiments, some or all of the steps may be performed by other devices or groups of devices of system 10.

Process 600 begins at 602 where account data for participating accounts is received from account issuers. For example, processing at 602 may include receiving a file from issuers who have opted in or otherwise elected to participate in the services offered by transaction management processor 16, where the file includes a list of participating or eligible accounts. This file may be used to establish a reference table of accounts for which transaction data is needed.

Processing continues at 604 where individual account holders register to participate in the system (e.g., as discussed in conjunction with FIG. 3 above). In some embodiments, only account holders whose issuer financial institution(s) have elected to participate (and have provided account information at 602) may register. That is, only accounts whose issuers have elected to participate may be used in some embodiments.

Processing continues at 606 where transaction management processor 16 receives daily feed(s) of transaction data from account issuer(s) and/or clearing associations (such as MasterCard International). For example, at 606 transaction data associated with participating accounts may be obtained via a data feed or data pull from database 18. This transaction data is used to update account holder profiles or records and to identify alert conditions as discussed in conjunction with FIG. 4, above.

In some embodiments, the processing associated with 606 may be performed on a regular or scheduled basis, or it may occur substantially in real time (e.g., when transaction data is made available). In some embodiments, transaction management processor 16 pulls or causes the retrieval of specific transaction information (e.g., information associated with registered accounts). In some embodiments, transaction database 18 pushes data to the transaction management processor 16 on a scheduled basis (e.g., for all transactions associated with registered accounts). In some embodiments, the transaction data may be obtained directly from one or more account issuers. In some embodiments, transaction data may be retrieved from an intermediary source, such as transaction database 16.

Processing continues at 608 where the transaction data obtained at 606 is associated with individual registered account holder profiles. For example, transaction data may be matched to an account holder profile by comparing the account number in the transaction data to a table of registered accounts held by registered account holders. The data is then formatted and made available for viewing by the account holder (e.g., via reports as in FIG. 5) and used to identify any alert conditions (e.g., via alert process of FIG. 4). In this manner, registered account holders are able to obtain accurate, up to date, and cross-account views of their current spending profile.

Databases

Referring to FIG. 7, a table represents account holder database 700 that may be stored at transaction management processor 16 according to an embodiment of the present invention.

The table includes entries identifying individual account holder profiles that may be established by registered account holders participating in the system of the present invention to establish, monitor and maintain spending controls. Some or all of the data in database 700 may be obtained during an account registration process (such as the process of FIG. 3) or during subsequent updates by an account holder. The table also defines fields 702-714 for each of the entries. In one embodiment, the fields specify: a customer identifier 702, one or more payment account identifiers 704, contact information 706, one or more short term goals 708, one or more long term goals 710, one or more spending targets 712, and one or more income targets 714.

Customer identifier 702 includes information identifying a particular customer registered to participate in the system of the present invention. Customer identifier 702 may be information assigned by transaction management processor 16 to uniquely identify a participating account holder or customer. Account identifiers 704 includes information identifying one or more payment accounts held by the customer identified at 702. These account identifiers may include, for example, payment card account identifiers, checking or savings account numbers (and associated routing numbers), or the like. Contact information 706 may include information such as address, phone numbers, email addresses, etc. entered by the customer to allow contact with the customer. Contact information 706 may also include information specifying desired modes of contact for alerts.

Short term goals 708 may include information provided by the customer relating to the customer's short term spending goals and targets. For example, a customer may identify one or more short term goals using a set of predefined goal categories or by creating one or more custom goals. Example short term goals may include: pay down debt by a certain dollar amount by a certain date, save for a large purchase (such as a television, automobile, etc.) by a certain date, save for a job change, save for a new baby, make a contribution to a charity, save for a new business, save for home improvements, etc. The specified goal may include a date to achieve the goal and a dollar objective. The goal may also include some periodicity in which a savings contribution should be made (e.g., weekly, monthly, etc). Short term goals 708 may also include information breaking the goals into individual spending categories.

Long term goals 710 may include similar information, but over a longer time period. For example, long term goals specified by a customer may include: saving for retirement, travel and vacation planning, education, etc. Again, these long term goals may include a time period, a dollar objective, and a periodicity in which the savings contribution should be made. Both these long term and short term goals may be tracked using reporting as described above so that the customer may track their progress towards achieving the goal. As with other reporting described herein, the customers progress may be tracked using actual account data from the account(s) linked to the system.

Spending targets 712 may include information provided by the customer relating to the customer's spending targets, including specific spending categories. In some embodiments, each customer may be presented with one or more Web pages that walk the customer through the establishment of one or more spending targets. Spending targets may be established in one or more categories including, for example: utility expenses (phone, electric, water, etc.), child care (daycare, child support, etc.), insurance (homeowner, vehicles, etc.), miscellaneous (taxes, groceries, etc.), medical expenses, loan payments, etc. Each of these spending targets may be set on a monthly and/or annual basis. In some embodiments, customers may establish variable payments. For example, a customer may track variable expenses, such as fuel expenses to ensure that alerts are not generated on a monthly basis if the customer's fuel expenses are high in one month but are on track for the year. In some embodiments, customers may establish target spending ranges, fixed spending amounts, custom categories, or the like. Again, pursuant to some embodiments, these spending targets are tracked using actual spending data from the account(s) linked to the customer's profile. Threshold data may also be provided which, when exceeded, may generate a spending alert for that target.

Income targets 714 may include information provided by the customer relating to the customer's income objectives, and may be associated with deposit accounts (e.g., where the customer desires to deposit a certain amount each year into that account). For example, a customer may use pre-set target categories or create their own so that they can track income targets such as: personal targets (including salary, bonus, birthdays, etc.), investment targets (including real-estate purchases, dividends, interest, gains, etc.), other targets (including severance, disability, government benefits, tax refunds, etc.). In some embodiments, savings bond or other investment purchase data may be imported or loaded for tracking. In some embodiments, the customer's entry of any target or goal information may be assisted through use of automated wizards or tools. In some embodiments, a customer may access a human advisor for consultation in establishing, adjusting, maintaining or achieving goals and targets.

Those skilled in the art, upon reading this disclosure, will realize that other fields and data items may be provided to allow customers to more accurately manage their spending across accounts.

Figure 8:
FIG. 8 is a tabular representation of a portion of a transaction database pursuant to some embodiments of the present invention.

Referring to FIG. 8, a table represents a transaction database 800 that may be stored at, or made available to, transaction management processor 16 according to an embodiment of the present invention.

The table includes entries identifying individual transactions that are associated with registered accounts. The data may be received from database 18 or directly from a clearing association or account issuers. The table also defines fields 802-808 for each of the entries. In one embodiment, the fields specify: a payment account identifier 802 used in the transaction, a transaction date 804, a transaction amount 806, and purchase details 808. The account identifier 802 is used to associate the transaction details with a particular customer account, and the purchase details 808 may be used to sort the transaction details into spending categories and update progress toward goals and targets. Those skilled in the art will appreciate that other transaction information may be provided to provide further insight into individual transactions.

The figures provided herein are block diagrams, flowcharts and control flow illustrations of methods, systems and program products according to some embodiments of the present invention. It will be understood that each block or step of the block diagrams, flowcharts and control flow illustrations, and combinations of blocks in the block diagrams, flowcharts and control flow illustrations, can be implemented by computer program instructions. These computer program instructions may be loaded onto a computer or other programmable apparatus to produce a machine, such that the instructions which execute on the computer or other programmable apparatus create means or devices for implementing the functions specified in the block diagrams, flowcharts or control flow block(s) or step(s). These computer program instructions may also be stored in a computer-readable memory that can direct a computer or other programmable apparatus to function in a particular manner, such that the instructions stored in the computer-readable memory produce an article of manufacture, including instruction means or devices which implement the functions specified in the block diagrams, flowcharts or control flow block(s) or step(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the block diagrams, flowcharts or control flow block(s) or step(s).

Accordingly, blocks or steps of the block diagrams, flowcharts or control flow illustrations support combinations of means or devices for performing the specified functions, combinations of steps for performing the specified functions and program instruction means or devices for performing the specified functions. It will also be understood that each block or step of the block diagrams, flowcharts or control flow illustrations, and combinations of blocks or steps in the block diagrams, flowcharts or control flow illustrations, can be implemented by special purpose hardware-based computer systems which perform the specified functions or steps, or combinations of special purpose hardware and computer instructions.

Although the present invention has been described with respect to example embodiments thereof, those skilled in the art will appreciate that various substitutions or modifications may be made without departing from the spirit and scope of the present invention.

What is claimed is:

1. A method for operating a transaction management processor, comprising:

establishing, by an account holder, at the transaction management processor, an account holder profile for the account holder, the account holder profile identifying at least a first and a second actual payment account issued by at least one financial institution to and held by the account holder, and at least one spending profile for said account holder, said spending profile including at least (i) a first spending target associated with said at least first and second actual payment accounts and (ii) a threshold value for nearing said at least first spending target;

automatically receiving, when electronic transaction data originating from a point of sale of a completed transaction associated with at least one of said at least first and second actual payment accounts is received at said transaction management processor, actual transaction data identifying individual payment transactions having occurred and associated with said at least first and second payment accounts;

updating, at said transaction management processor, said spending profile, established by said account holder, based on said actual transaction data associated with said at least first and second actual payment accounts;

comparing, by said transaction management processor, said actual transaction data to said at least first spending target included in said spending profile for said account holder;

determining, based on said comparing, when said threshold value, as established by the account holder, has been reached for nearing said at least first spending target associated with said at least first and second actual payment accounts; and when said threshold value for nearing said at least first spending target has been reached, generating a spending alert message to notify said account holder.

2. The method of claim 1, wherein said at least first spending target is constrained to a specified time period.

3. The method of claim 1, wherein said at least first spending target is constrained to a spending category within a specified time period.

4. The method of claim 1, wherein said spending profile includes at least a first spending category.

5. The method of claim 1, wherein said spending profile includes a plurality of spending categories selected by said account holder.

6. The method of claim 4, wherein said at least a first spending category includes at least one of: an automobile expense category, a cash expense category, a dining category, a groceries category, a travel category, and a utilities category.

7. The method of claim 1, wherein said first actual payment account includes at least one of a credit card account, a debit card account, a checking account, and a savings account.

8. The method of claim 1, wherein said spending alert message is at least one of: a text message, an update to a Web page, a telephone message, a page, and an email message.

9. The method of claim 1, wherein said spending profile further includes at least a first transaction alert trigger, said at least first transaction alert trigger specifying at least one transaction alert trigger condition.

10. The method of claim 9, wherein said at least first transaction alert trigger condition includes at least one of: a transaction size, a daily transaction limit, a transaction medium, a transaction location, and a transaction type.

11. The method of claim 9, further comprising:

comparing said actual transaction data to said at least first transaction alert trigger to determine if any transaction alert trigger conditions are met.

12. The method of claim 11, further comprising:

transmitting a transaction alert message to said account holder if said at least first transaction alert trigger condition is met.

13. The method of claim 1, further comprising a medium storing processor-executable code to perform each of said establishing, receiving, updating and comparing steps.

\* \* \* \* \*